Patented Nov. 16, 1926.

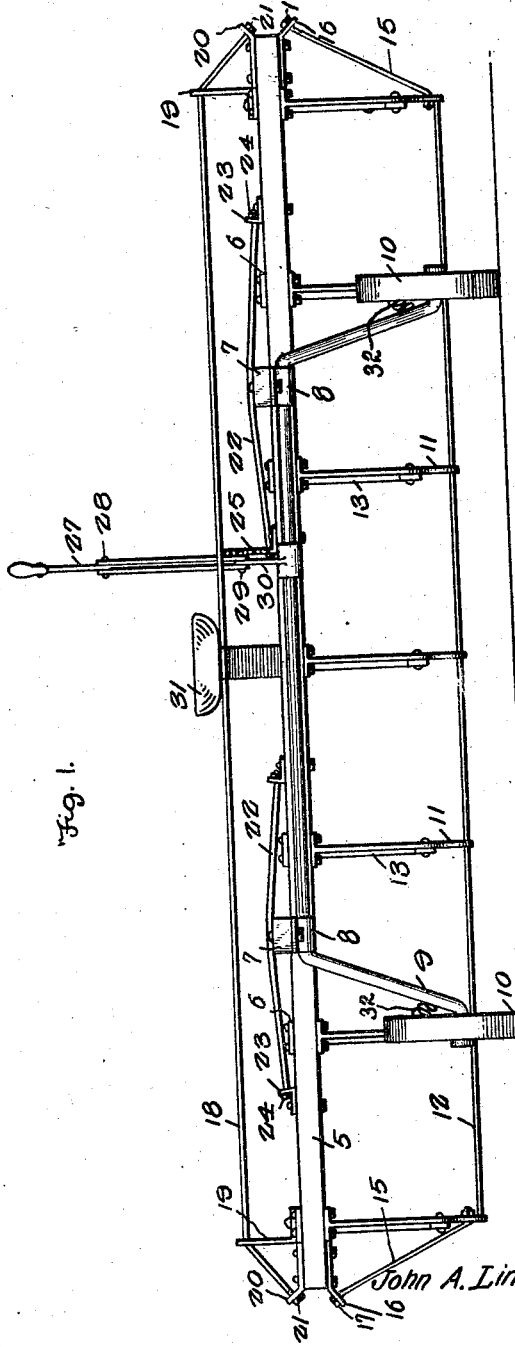

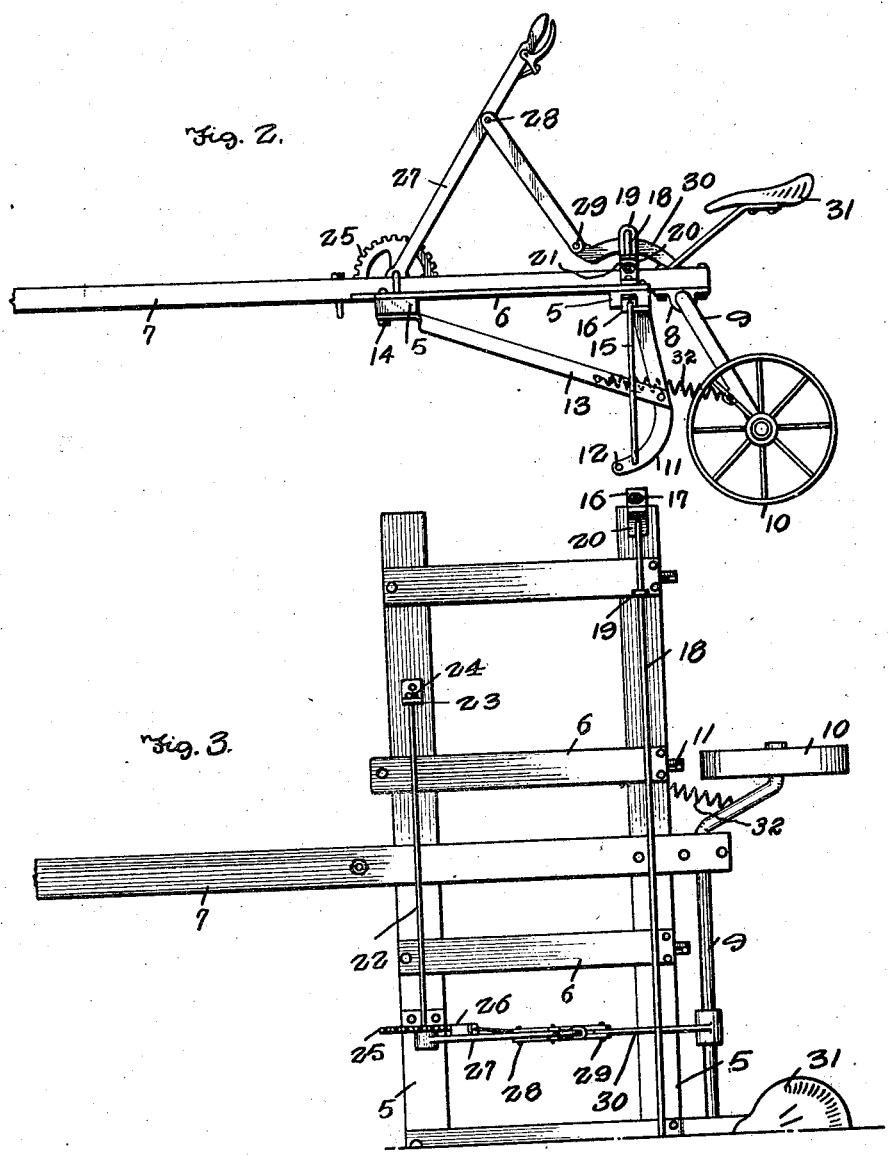

1,607,203

UNITED STATES PATENT OFFICE.

JOHN AUGUST LINDQUIST, OF CABIN LAKE, ALBERTA, CANADA.

WEEDER.

Application filed November 17, 1925. Serial No. 69,676.

This invention relates to agricultural implements, and has more particular reference to an improved device for removing weeds from the ground preparatory to tilling and sowing seeds in the same.

The primary object of the invention is to provide a weeder which is extremely simple and durable in construction as well as efficient in operation.

Another object is to provide a weeder embodying a transverse bar adapted to be caused to travel under the surface of the soil for uprooting and removing the weeds, means being provided for readily raising and lowering the weeder bar for regulating the depth at which the same passes beneath the surface of the soil.

A further object is to provide a weeder of the above kind embodying a frame of simple and durable construction.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a rear elevational view of a weeder constructed in accordance with the present invention, Figure 2 is a side elevational view thereof, and Figure 3 is a top plan view showing one-half of the weeder which is identical with the remaining half, not shown.

Referring more in detail to the drawings, the present invention includes a frame composed of relatively long, spaced parallel transverse frame bars 5 which are rigidly connected at intervals by means of longitudinal frame bars 6. A pair of spaced longitudinal draft tongues 7 are provided with rear ends extending across the transverse frame bars 5 and rigidly secured to the latter at equal distances from the longitudinal center of the frame and the ends of the latter, and these draft tongues may be equipped with suitable devices such as whipple-trees for facilitating hitching of draft animals thereto. The rear ends of the draft tongues 7 project slightly rearwardly beyond the rear transverse frame bar 5 and have transversely aligned bearings 8 secured to the under sides thereof in which is journalled the intermediate crank portion of a crank axle 9 which also embodies depending end legs terminating in outturned ends upon which the ground engaging or supporting wheels 10 are journalled.

Secured at their upper ends to the under side of the rear transverse frame bar 5 are a plurality of depending standards 11 which are arranged at regular intervals in side by side relation. These standards 11 terminate in forwardly directed lower ends as clearly shown in Figure 2 provided with aligned apertures through which extend a weeder rod 12. The weeder rod is suitably secured in place in the ends of the standard so as to extend transversely directly beneath the rear frame bar 5 and in order to prevent damage to the standard from rearward bending strains placed thereon in the use of the device, these standards are rigidly attached to the rear ends of longitudinal brace rods 13 which extend forwardly and upwardly and have their forward ends secured as at 14 to the under side of the forward frame bar 5.

The weeder rod 12 may consist of an iron bar or a cable as found most desirable, and the same is effectively maintained in a taut or braced position by means of truss rods 15 which have their lower inner ends rigidly fastened to the end standards 11 and have their outer ends slidably disposed through angular brackets 16 secured to the adjacent ends of the rear frame bar 5. Suitable means such as nuts 17 threaded upon the outer ends of the truss rods 15 are provided for tensioning the weeder bar 12 by exerting an outward pull upon the end standards 11 as is obvious. In order to brace the rear frame bar 5 against bending or warping and to insure maintenance of the weeder rod 12 under tension by means of the truss rods 15, said rear frame bar 5 is provided with a truss rod 18 which is disposed above and parallel with the rear frame bar and passes over upstanding brackets 19 at its ends, the brackets 19 being fastened upon the ends of the rear frame bar 5. The ends of the truss rod 18 pass through apertures in brackets 20 rigidly secured to the ends of the rear frame bar 5 outwardly of the brackets 19, and nuts 21 are threaded upon the ends of the truss rod 18 at the outer sides of the brackets 20 so as to permit placing of the truss rod 18 under tension.

The forward frame bar 5 is braced by means of a pair of transverse truss rods 22, one of which is disposed at each side of the longitudinal center of the weeder frame and has its ends slidable through brackets 23 fastened upon the forward frame bar 5 as clearly shown. The truss bars 22 are disposed parallel with the frame bar 5 and pass over the adjacent portions of the draft tongues 7 so as to also effectively brace the latter against lateral strains. Nuts 24 are threaded upon the end of the truss bars 22 at the outer sides of the brackets 23 so that said truss bars or rods 22 may be placed under proper tension.

As clearly shown in Figures 1 and 3, one of the brackets 23 is formed with an upwardly projecting extension in the form of a rack segment 25 which is engaged by a suitable latch provided as generally indicated at 26 on a longitudinally swinging hand lever 27 which is pivoted upon the frame coincident with the axis of the segment 25. The hand lever 27 has a link pivoted thereto adjacent its upper end as indicated at 28, and the other end of this link is pivoted as at 29 to the forward upper end of a forwardly and upwardly projecting arm 30 rigid with the intermediate portion of the axle 9. It is thus apparent that when the lever 27 is swung forwardly an upward pull may be exerted on the arm 30 for causing the axle 9 to turn in the bearings 8 and thereby bring the legs of the axle toward a vertical position so as to elevate the weeder bar 12 and the frame carrying the same. On the other hand, a rearward swinging movement of the lever 27 effects a rearward movement of the legs of the axle 9 so that the frame and weeder bar are lowered. In this way the depth at which the weeder bar 12 is positioned beneath the surface of the soil may be regulated and the weeder bar may be completely held out of the ground when the device is not in use.

A suitable seat 31 may be supported upon the intermediate portion of the rear frame bar 5 so as to accommodate an operator in proper position for manipulation of the lever 27 and for controlling the draft animals hitched to the draft tongues 7.

In operation, the forward travelling movement of the weeder is effected and the lever 27 is then brought rearwardly so as to cause lowering of the weeder bar 12 into engagement with the grounds. Further lowering of the bar 12 results in passage of the latter below the surface of the ground, and when the same has reached the desired depth the lever 27 is latched in position by engagement of the latch 26 with the segment 25. As the transverse weeder bar 12 passes under the surface of the soil the weeds are effectively uprooted as is well known with devices of this general type. As the weeds are uprooted they will be allowed to pass upwardly and rearwardly from the weeder bars by reason of the forwardly extending lower ends of the standards 11 furnishing clearance at points where the same are provided.

When the operation of the weeder is completed the device may be more readily transported to the desired destination by swinging the lever 27 forwardly so as to exert an upward pull upon the arm 30 and cause the axle to swing so that its legs move toward a vertical position. This effects lifting of the frame and consequent lifting of the weeder bar 12 out of the soil or ground.

From the foregoing description it is believed that the construction and operation as well as the advantages of the present invention will be readily understood and appreciated by those skilled in the art.

Helical tension springs 32 may be employed to assist in returning the end crank portions of axle 9 to vertical position wherein the weeder rod 12 is raised, and these springs are shown as attached to said crank portions of the axle and the adjacent braces 13.

What I claim as new is:

1. A weeder of the character described comprising a transversely elongated frame including fixed front and rear transverse frame bars, standards rigidly secured to and depending from the rear frame bar and terminating in forwardly directed lower ends provided with aligned transverse apertures, a weeder rod extending through the apertures in the lower ends of the standards and secured to the latter, and forwardly and upwardly inclined braces rigidly attached at their rear lower ends to the lower portions of the standards and at their forward upper ends to the forward frame bar, and wheeled supporting means for the frame shiftable relative to the frame for varying the elevation of the frame and the weeder rod.

2. A weeder of the character described including a rectangular transversely elongated frame embodying rigidly connected front and rear transverse frame bars, standards rigidly secured to and depending from the rear frame bar in side by side spaced relation, a transverse weeder rod connecting and rigidly secured to the lower ends of the standards, and wheeled supporting means for the frame arranged rearwardly of the rear frame bar and shiftable relative to the frame for varying the elevation of the frame and weeder rod whereby the latter may be disposed to pass beneath the surface of the soil or withdrawn upwardly therefrom.

3. A weeder of the character described including a rectangular transversely elongated frame embodying rigidly connected front and rear transverse frame bars, standards rigidly secured to and depending from the rear frame bar in side by side spaced relation, a transverse weeder rod connecting and rigidly secured to the lower ends of the standards, and wheeled supporting means shiftable for varying the elevation of the frame and weeder rod whereby the latter may be disposed to pass beneath the surface of the soil or withdrawn upwardly therefrom, and a pair of longitudinal tongues secured to the frame at opposite sides of the longitudinal center of the latter, said tongues projecting beyond the rear of the frame and having transversely aligned bearings secured thereto, said wheeled supporting means for the frame embodying a crank axle having its intermediate portion journaled in said bearings.

4. A weeder of the character described comprising a transversely elongated frame including front and rear transverse frame bars, standards rigidly secured to and depending from the rear frame bar and terminating in forwardly directed lower ends provided with aligned transverse apertures, a weeder rod extending through the apertures in the lower ends of the standards and secured to the latter, and braces attached at their rear ends to the lower portions of the standards and at their forward ends to the forward frame bar, and adjustable truss rods between the ends of the rear transverse frame bar and the end standards for maintaining the weeder rod in taut condition.

5. A weeder of the character described comprising a transversely elongated frame including front and rear transverse frame bars, standards rigidly secured to and depending from the rear frame bar and terminating in forwardly directed lower ends provided with aligned transverse apertures, a weeder rod extending through the apertures in the lower ends of the standards and secured to the latter, and braces attached at their rear ends to the lower portions of the standards and at their forward ends to the forward frame bar, brackets secured upon the ends of the rear frame bar, a transverse truss rod overlying and parallel with the rear transverse frame bar and passing over said brackets and further brackets rigidly secured to the ends of the rear frame bars and having the ends of the truss rod passed therethrough, said truss rod having nuts upon the ends thereof outwardly of the last named bracket for placing the truss rod under tension.

In testimony whereof I affix my signature.

JOHN AUGUST LINDQUIST.